(12) United States Patent
Li et al.

(10) Patent No.: US 8,493,922 B2
(45) Date of Patent: Jul. 23, 2013

(54) METHOD AND APPARATUS FOR SUPPORTING FREQUENCY DIVISION MULTIPLEXING OR TIME DIVISION MULTIPLEXING IN WIRELESS PEER-TO-PEER NETWORKS

(75) Inventors: Junyi Li, Chester, NJ (US); Saurabh Tavildar, Jersey City, NJ (US); Nilesh Khude, Bridgewater, NJ (US); Thomas Richardson, South Orange, NJ (US); Rajiv Laroia, Far Hills, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 371 days.

(21) Appl. No.: 12/832,787

(22) Filed: Jul. 8, 2010

(65) Prior Publication Data
US 2012/0008570 A1   Jan. 12, 2012

(51) Int. Cl.
*H04W 4/00* (2009.01)
(52) U.S. Cl.
USPC ........ 370/329; 370/231; 455/135; 455/226.4; 455/513; 455/522
(58) Field of Classification Search
None
See application file for complete search history.

(56) References Cited

U.S. PATENT DOCUMENTS

2008/0188233 A1   8/2008  Borran et al.
2009/0016219 A1*  1/2009  Laroia et al. .................. 370/231
2009/0036138 A1   2/2009  Horn et al.
2009/0149188 A1   6/2009  McBeath et al.
2009/0262699 A1  10/2009  Wengerter et al.
2011/0117852 A1*  5/2011  Copeland et al. ............... 455/62

FOREIGN PATENT DOCUMENTS

WO      2009/053736 A1   4/2009
WO   WO2010011796 A2    1/2010

OTHER PUBLICATIONS

Ghosh, "Innovative Approaches to Spectrum Selection, Sensing, and Sharing in Cognitive Radio Networks", Dissertation in Computer Science and Engineering. University of Cincinnati, Ohio, Apr. 2009. 206 pages.
Balaji Rengarajan et al: "Self-organizing Dynamic Fractional Frequency Reuse on the uplink of OFDMA systems", Information Sciences and Systems (CISS), 2010 44th Annual Conference on, IEEE, Piscataway, NJ, USA, Mar. 17, 2010, pp. 1-6, XP031676327, ISBN: 978-1-4244-7416-5.
International Search Report and Written Opinion—PCT/US2011/043242, ISA/EPO—Oct. 20, 2011.
Xinzhou Wu et al: "FlashLinQ: A synchronous distributed scheduler for peer-to-peer ad hoc networks", Communication, Control, and Computing (Allerton), 2010 48th Annual Allerton Conference on, IEEE, Sep. 29, 2010, pp. 514-521, XP031899421, DOI: 10.1109/Allerton.2010.5706950 ISBN: 978-1-4244-8215-3.
Xinzhou Wu: "FlashLinQ: A Clean Slate Design for Ad Hoc", Qualcomm May 4, 2010, XP002660751, Retrieved from the Internet: URL: scenic.princeton.edu/ppt/FLQEdge.ppt [retrieved on Oct. 6, 2011].

* cited by examiner

*Primary Examiner* — Ayaz Sheikh
*Assistant Examiner* — Nicholas Sloms
(74) *Attorney, Agent, or Firm* — James K. O'Hare

(57) ABSTRACT

A method of operating a wireless device includes determining a preferred subset of bands of a set of bands for communicating with a first node, communicating a scheduling request with the first node, and determining whether to schedule a data transmission on each band of the set of bands based on the preferred subset of bands and the scheduling request.

56 Claims, 13 Drawing Sheets

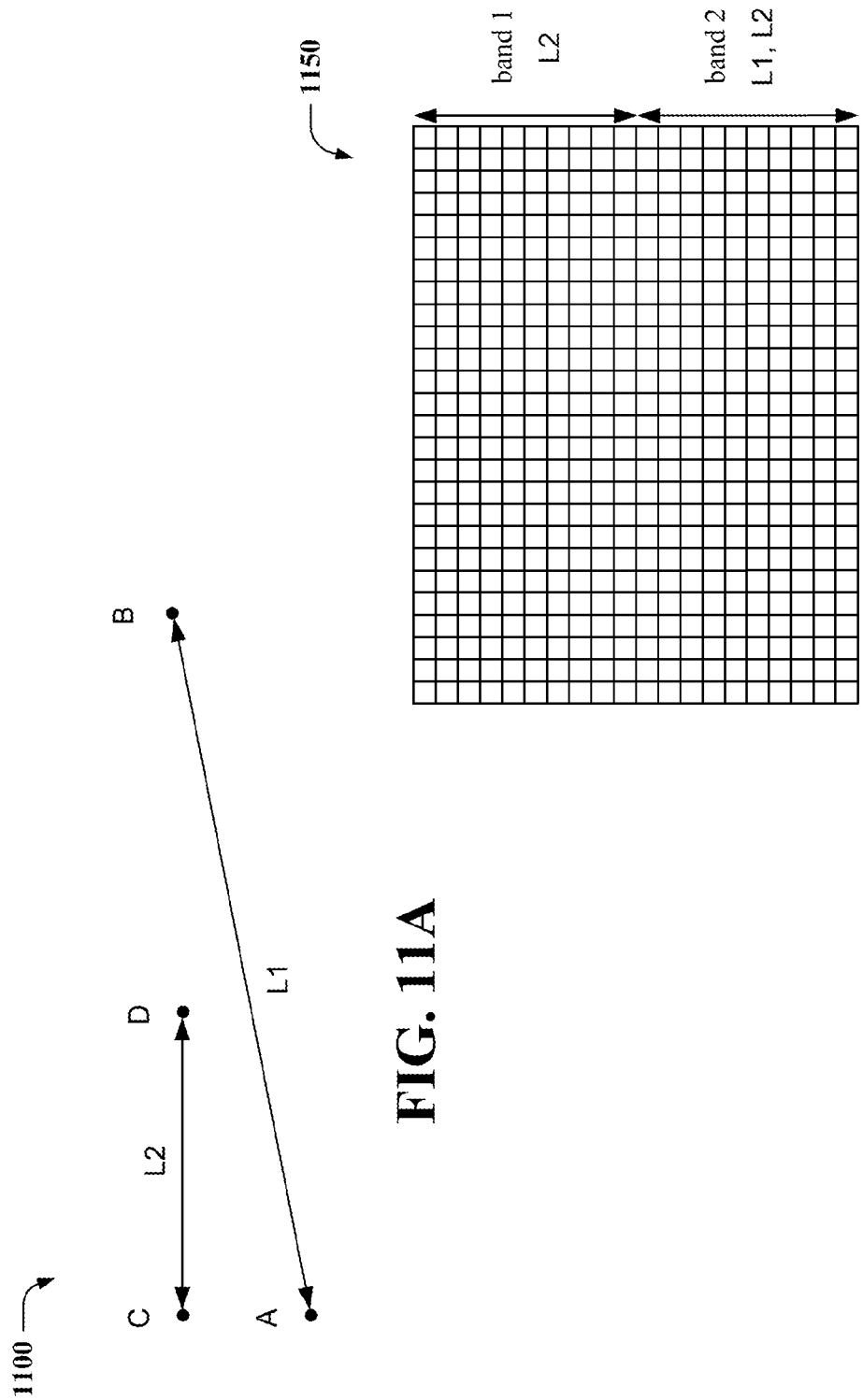

_US 8,493,922 B2_

METHOD AND APPARATUS FOR SUPPORTING FREQUENCY DIVISION MULTIPLEXING OR TIME DIVISION MULTIPLEXING IN WIRELESS PEER-TO-PEER NETWORKS

BACKGROUND

1. Field

The present disclosure relates generally to communication systems, and more particularly, to supporting frequency division multiplexing (FDM) or time division multiplexing (TDM) in wireless peer-to-peer networks.

2. Background

In a peer-to-peer wireless network in which links are scheduled on the entire band, long links get a low data rate because they have a low signal to interference plus noise ratio (SINR) and they leave a large footprint. The large footprint causes long links to share the resource with many other links. Because the long links share the resource with other links such as shorter links, the long links get scheduled less often compared to the short links. Furthermore, due to the larger footprint, when a long link is scheduled, many other high rate short links in the vicinity of the long link cannot be scheduled causing a significant decrease in the system throughput. There is a need for alleviating this problem causing a decrease in the system throughput.

SUMMARY

In an aspect of the disclosure, a method of operating a wireless device includes determining a preferred subset of bands of a set of bands for communicating with a first node, communicating a scheduling request with the first node, and determining whether to schedule a data transmission on each band of the set of bands based on the preferred subset of bands and the scheduling request.

In an aspect of the disclosure, an apparatus for wireless communication includes means for determining a preferred subset of bands of a set of bands for communicating with a first node, means for communicating a scheduling request with the first node, and means for determining whether to schedule a data transmission on each band of the set of bands based on the preferred subset of bands and the scheduling request.

In an aspect of the disclosure, a computer program product in a wireless device includes a computer-readable medium. The computer-readable medium includes code for determining a preferred subset of bands of a set of bands for communicating with a first node, communicating a scheduling request with the first node, and determining whether to schedule a data transmission on each band of the set of bands based on the preferred subset of bands and the scheduling request.

In an aspect of the disclosure, an apparatus for wireless communication includes a processing system. The processing system is configured to determine a preferred subset of bands of a set of bands for communicating with a first node, to communicate a scheduling request with the first node, and to determine whether to schedule a data transmission on each band of the set of bands based on the preferred subset of bands and the scheduling request.

BRIEF DESCRIPTION OF THE DRAWINGS

FIG. 11A is a first diagram for illustrating splitting the bands between long and short links.

FIG. 11B is a second diagram for illustrating splitting the bands between long and short links.

DETAILED DESCRIPTION

Figure 1:
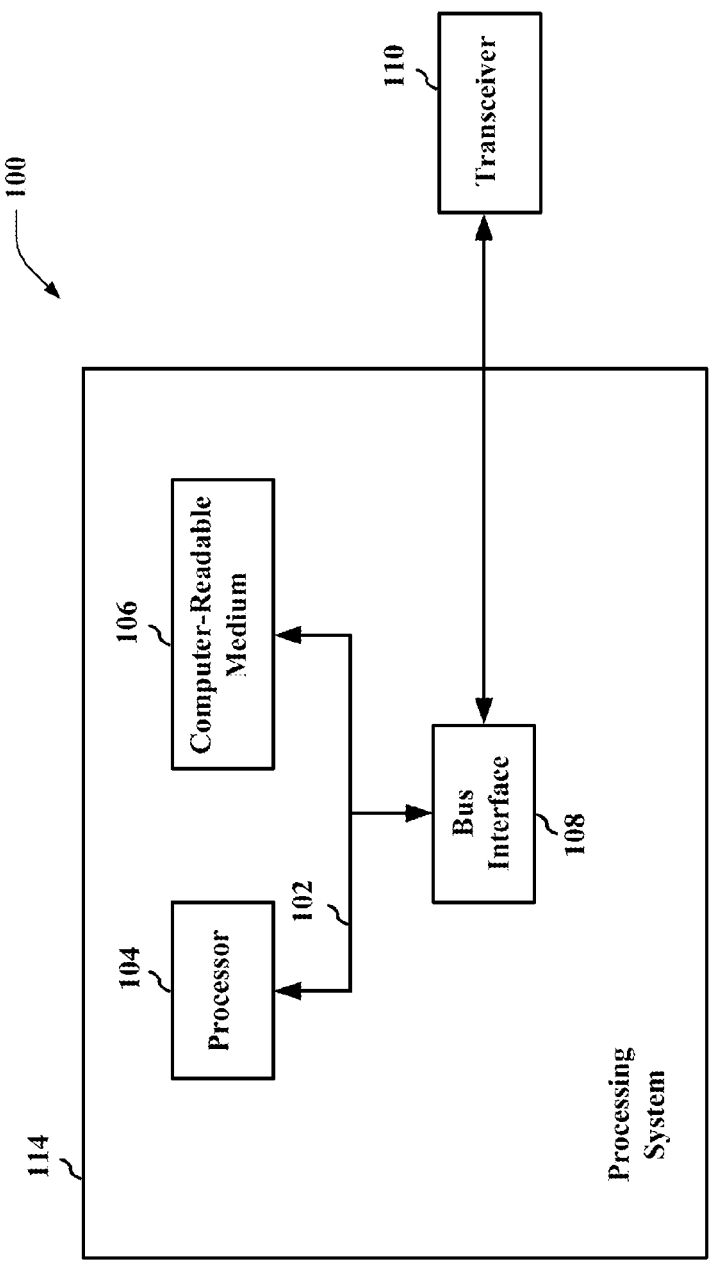
FIG. 1 is a diagram illustrating an example of a hardware implementation for an apparatus employing a processing system.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of communication systems will now be presented with reference to various apparatus and methods. These apparatus and methods will be described in the following detailed description and illustrated in the accompanying drawing by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium. A computer-readable medium may include, by way of example, a magnetic storage device (e.g., hard disk, floppy disk, magnetic strip), an optical disk (e.g., compact disk (CD), digital versatile disk (DVD)), a smart card, a flash memory device (e.g., card, stick, key drive), random access memory (RAM), read only memory (ROM), programmable ROM (PROM), erasable PROM (EPROM), electrically erasable PROM (EEPROM), a register, a removable disk, a carrier wave, a transmission line, and any other suitable medium for storing or transmitting software. The computer-readable medium may be resident in the processing system, external to the processing system, or distributed across multiple entities including the processing system. Computer-readable medium may be embodied in a computer-program product. By way of example, a computer-program product may include a computer-readable medium in packaging materials. Those skilled in the art will recognize how best to implement the described functionality presented throughout this disclosure depending on the particular application and the overall design constraints imposed on the overall system.

FIG. 1 is a conceptual diagram illustrating an example of a hardware implementation for an apparatus 100 employing a processing system 114. The apparatus 100 may be referred to by those skilled in the art as user equipment, a mobile station, a subscriber station, a mobile unit, a subscriber unit, a wireless unit, a wireless node, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. The processing system 114 may be implemented with a bus architecture, represented generally by the bus 102. The bus 102 may include any number of interconnecting buses and bridges depending on the specific application of the processing system 114 and the overall design constraints. The bus 102 links together various circuits including one or more processors, represented generally by the processor 104, and computer-readable media, represented generally by the computer-readable medium 106. The bus 102 may also link various other circuits such as timing sources, peripherals, voltage regulators, and power management circuits, which are well known in the art, and therefore, will not be described any further. A bus interface 108 provides an interface between the bus 102 and a transceiver 110. The transceiver 110 provides a means for communicating with various other apparatuses over a transmission medium.

The processor 104 is responsible for managing the bus 102 and general processing, including the execution of software stored on the computer-readable medium 106. The software, when executed by the processor 104, causes the processing system 114 to perform the various functions described infra for any particular apparatus. The computer-readable medium 106 may also be used for storing data that is manipulated by the processor 104 when executing software.

Figure 2:
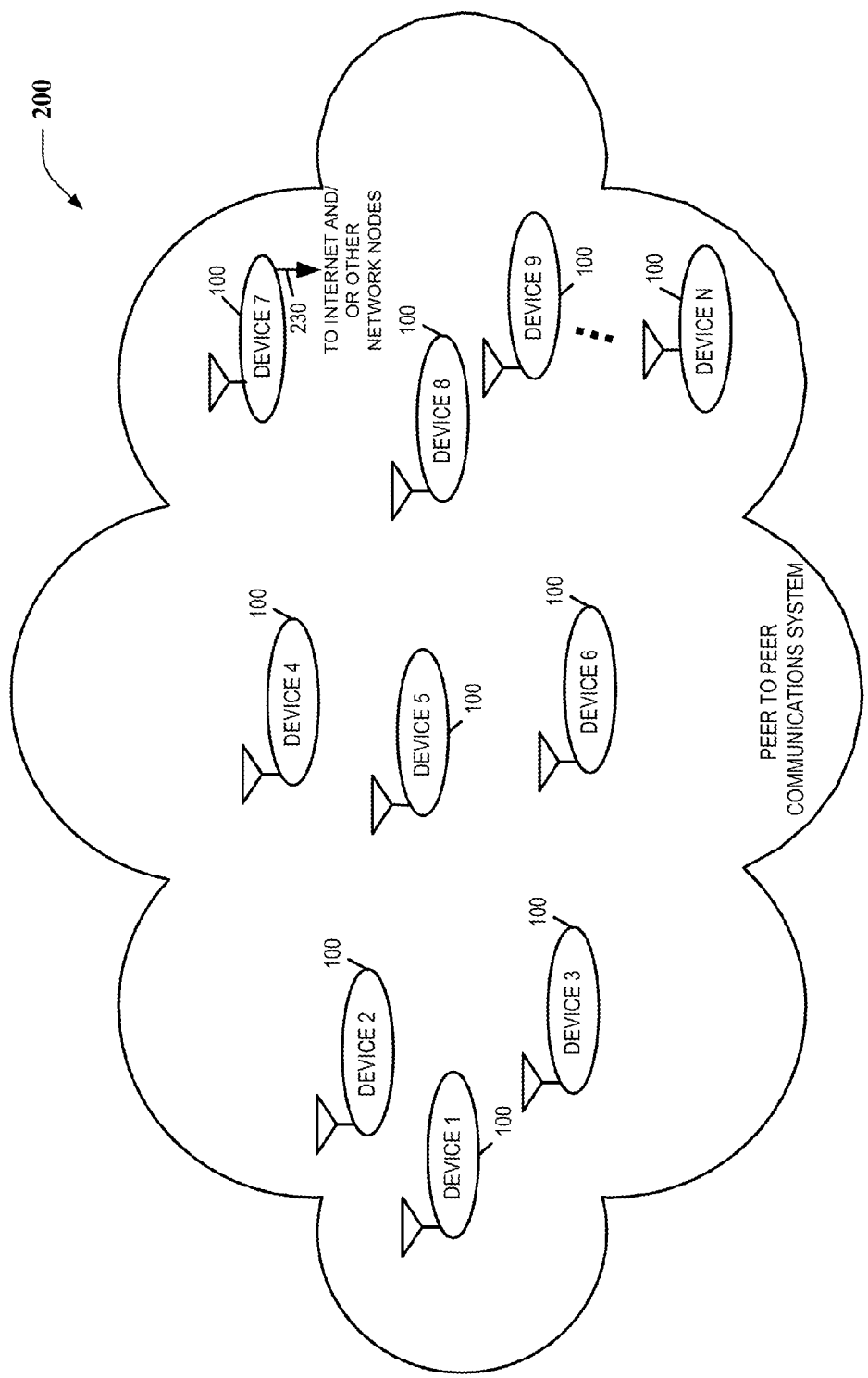
FIG. 2 is a drawing of an exemplary wireless peer-to-peer communications system.

FIG. 2 is a drawing of an exemplary wireless peer-to-peer communications system 200. The wireless peer-to-peer communications system 200 includes a plurality of wireless communications devices 100. Some of the wireless communications devices 100, such as device 7, for example, include an interface 230, to the Internet and/or other network nodes. Some of the wireless communications devices 100 may be mobile wireless communication devices such as handheld mobile devices. The wireless communications devices 100 support direct peer-to-peer communications.

The exemplary methods and apparatuses discussed infra are applicable to any of a variety of wireless peer-to-peer communications systems, such as for example, a wireless peer-to-peer communication system based on FlashLinQ, WiMedia, Bluetooth, ZigBee, or Wi-Fi based on the IEEE 802.11 standard. To simplify the discussion, the exemplary methods and apparatus are discussed within the context of FlashLinQ in relation to FIGS. 3, 4, 5, 6A, and 6B. However, one of ordinary skill in the art would understand that the exemplary methods and apparatuses are applicable more generally to a variety of other wireless peer-to-peer communication systems.

Figure 3:
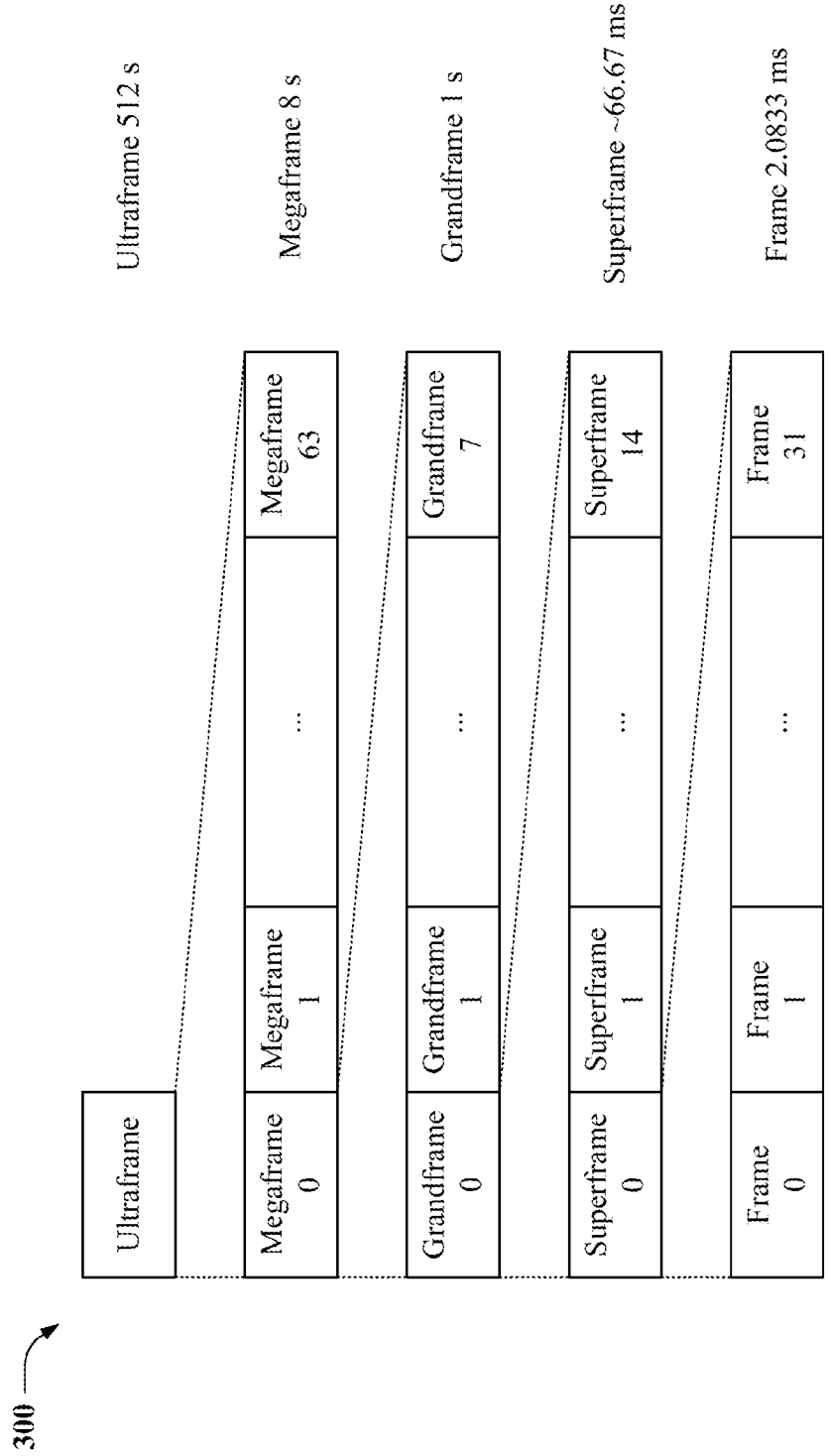
FIG. 3 is a diagram illustrating a time structure for peer-to-peer communications between the wireless communication devices.

FIG. 3 is a diagram 300 illustrating a time structure for peer-to-peer communications between the wireless communication devices 100. An ultraframe is 512 seconds and includes 64 megaframes. Each megaframe is 8 seconds and includes 8 grandframes. Each grandframe is 1 second and includes 15 superframes. Each superframe is approximately 66.67 ms and includes 32 frames. Each frame is 2.0833 ms.

Figure 4:
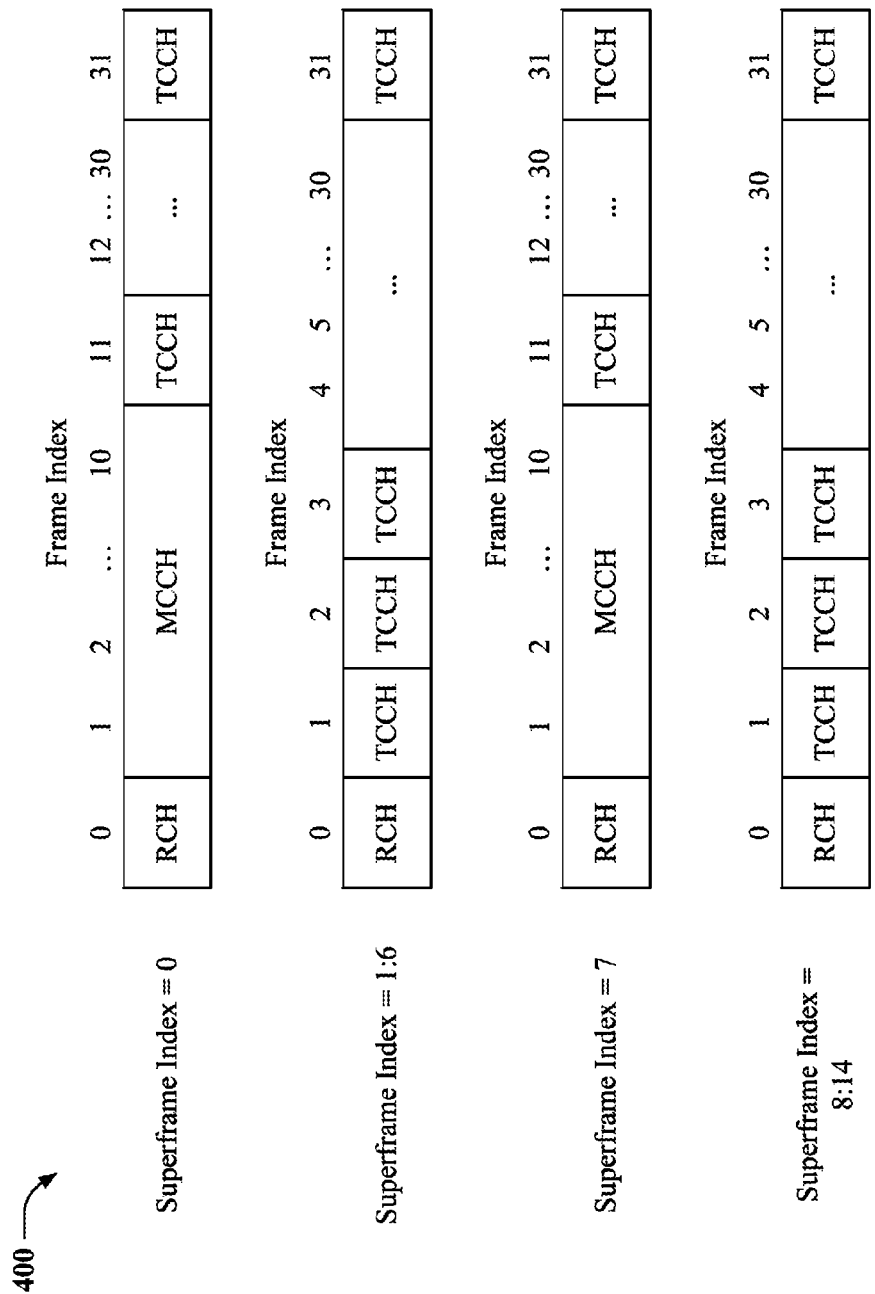
FIG. 4 is a diagram illustrating the channels in each frame of superframes in one grandframe.

FIG. 4 is a diagram 400 illustrating the channels in each frame of superframes in one grandframe. In a first superframe (with index 0), frame 0 is a reserved channel (RCH), frames 1-10 are each a miscellaneous channel (MCCH), and frames 11-31 are each a traffic channel (TCCH). In the $2^{nd}$ through $7^{th}$ superframes (with index 1:6), frame 0 is a RCH and frames 1-31 are each a TCCH. In an $8^{th}$ superframe (with index 7), frame 0 is a RCH, frames 1-10 are each a MCCH, and frames 11-31 are each a TCCH. In the $9^{th}$ through $15^{th}$ superframes (with index 8:14), frame 0 is a RCH and frames 1-31 are each a TCCH. The MCCH of superframe index 0 includes a secondary timing synchronization channel, a peer discovery channel, a peer page channel, and a reserved slot. The MCCH of superframe index 7 includes a peer page channel and reserved slots. The TCCH includes connection scheduling, a pilot, channel quality indicator (CQI) feedback, a data segment, and an acknowledgement (ACK).

Figure 5:
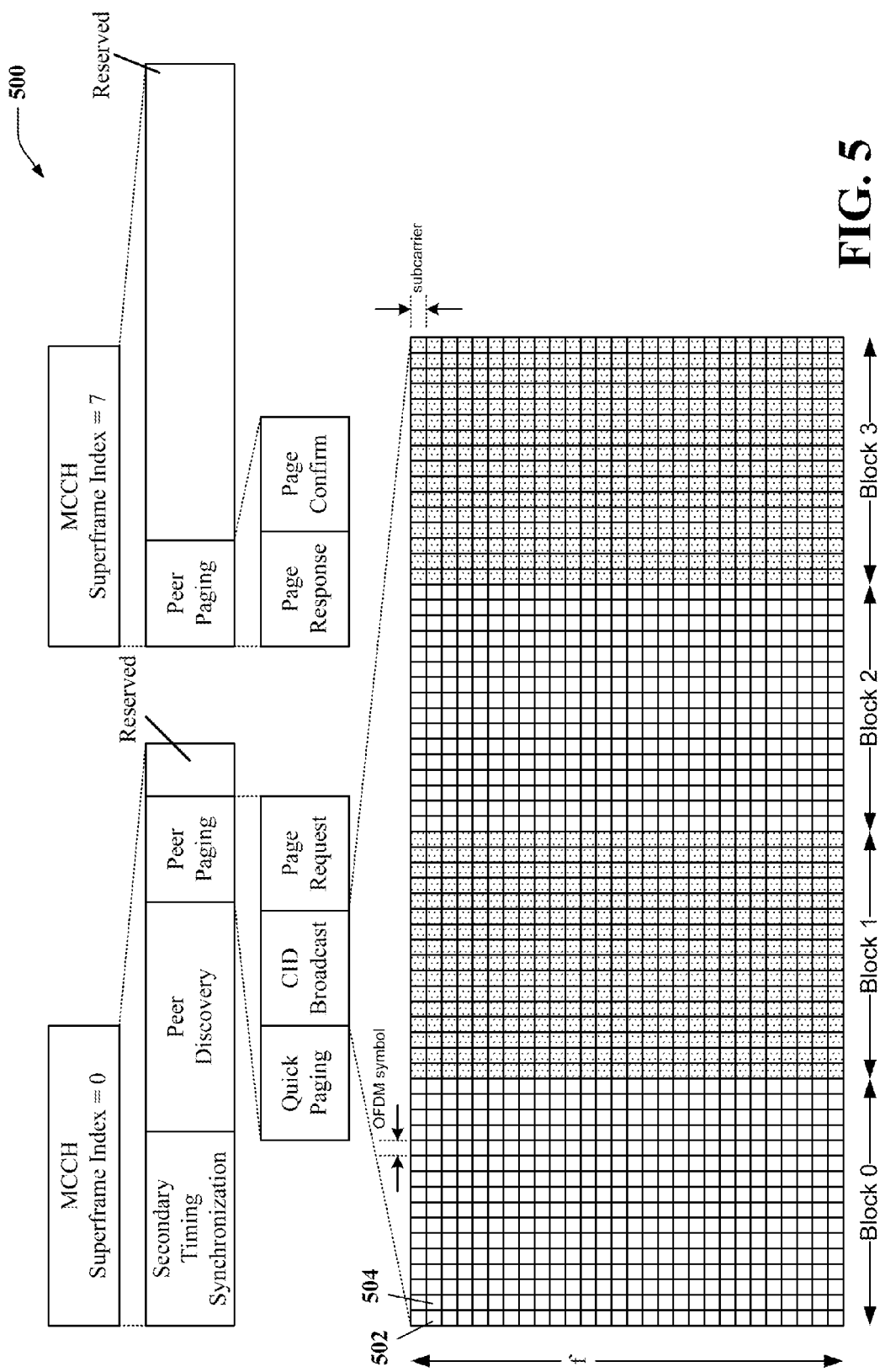
FIG. 5 is a diagram illustrating an operation timeline of a miscellaneous channel and a structure of the CID broadcast.

FIG. 5 is a diagram 500 illustrating an operation timeline of the MCCH and a structure of the CID broadcast. As discussed in relation to FIG. 4, the MCCH of superframe index 0 includes a secondary timing synchronization channel, a peer discovery channel, a peer paging channel, and a reserved slot. The peer paging channel in the MCCH of superframe index 0 includes a quick paging channel, a CID broadcast channel, and a page request channel. The MCCH of superframe index 7 includes a peer paging channel and a reserved slot. The peer paging channel in the MCCH of superframe index 7 includes a page response channel and a page confirm channel. The CID broadcast channel provides a distributed protocol for CID allocations for new connections, provides a mechanism for CID collision detection, and provides a wireless node evidence that its link connection with a communication peer still exists.

The structure of the CID broadcast consists of four blocks, each of which contains a plurality of resource elements, i.e., a plurality of subcarriers in the frequency domain and orthogonal frequency divisional multiplexing (OFDM) symbols in the time domain. Each of the four blocks spans a plurality of subcarriers (e.g., 28 subcarriers) and includes 16 OFDM symbols. One resource element (or tone) corresponds to one subcarrier and one OFDM symbol.

For each CID, a pair of adjacent resource elements is allocated in each of the four blocks for the CID broadcast. In a pair of adjacent resource elements, a first resource element carries an energy proportional to a power used to transmit in the TCCH and a second resource element carries an energy inversely proportional to a power received in the TCCH. For a given CID, each pair of resource elements has a fixed OFDM symbol position and a varying subcarrier within the block that varies each grandframe. In any given link, the wireless node that initiated the link randomly selects a block from Block 0 and Block 2 for the CID broadcast and the other wireless node in the link randomly selects a block from Block 1 and Block 3 for the CID broadcast. As such, for a particular CID, only half of the allocated resources are utilized by a link with that CID. Due to the random selection of a block, a first wireless node in a link with a second wireless node will be able to detect a CID collision when a third wireless node or a fourth wireless node in a different link transmits a CID broadcast using a block different than the block selected by the first wireless node or the second wireless node.

For example, assume a wireless node with a CID=4 selects Block 0 for the CID broadcast. The wireless node may be allocated resource elements 502, 504 for the CID broadcast. In resource element 502, the wireless node transmits an energy proportional to a power used to transmit in the TCCH. In resource element 504, the wireless node transmits an energy inversely proportional to a power received in the TCCH. In a subsequent grandframe, the wireless node may have a different pair of resource elements with a different subcarrier, but the same relative OFDM symbol position (i.e., in this example, the first and the second OFDM symbol of the selected block).

Figure 6:
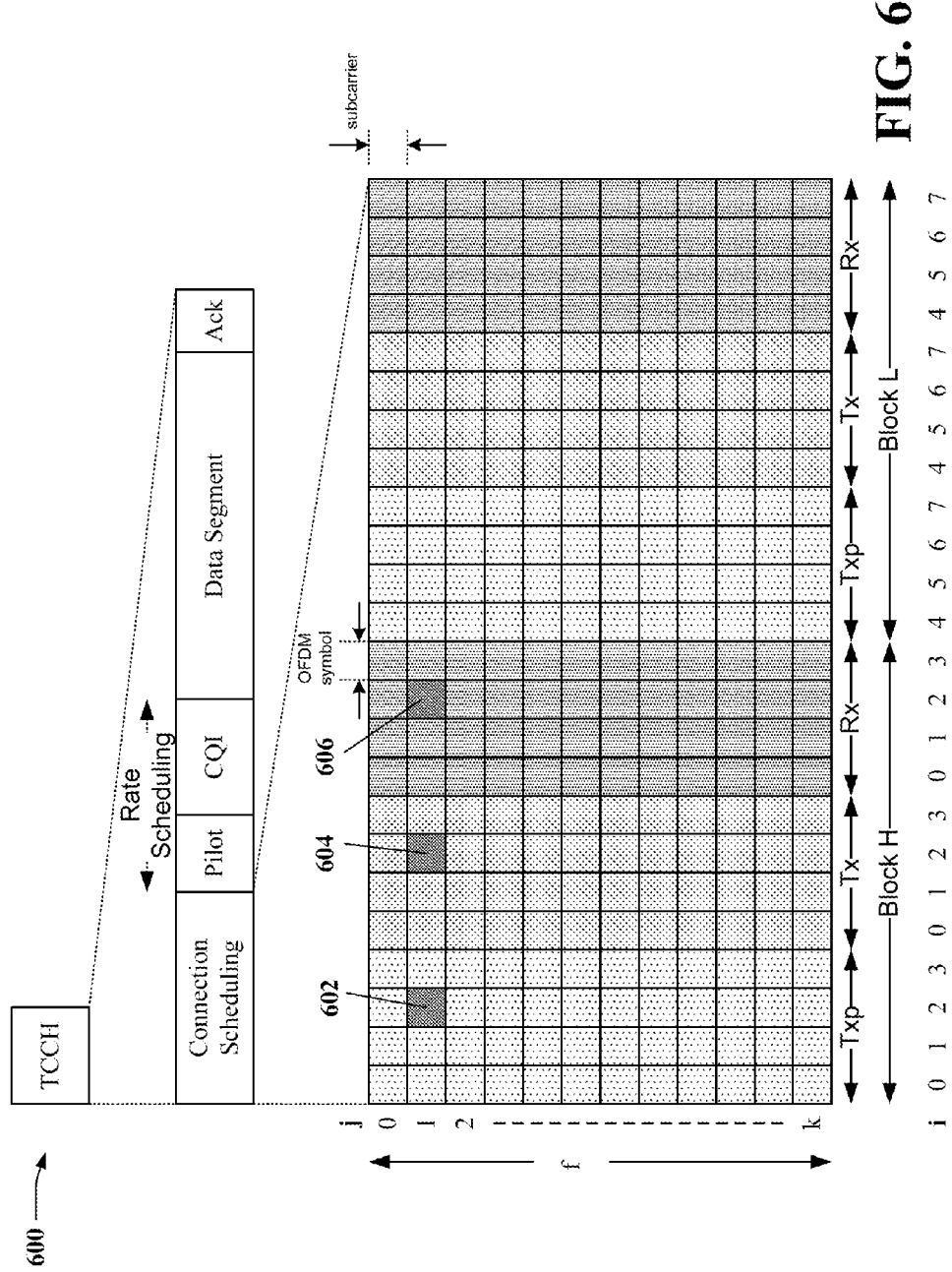
FIG. 6 is a diagram illustrating an operation timeline of a traffic channel slot and a structure of connection scheduling.

FIG. 6 is a diagram 600 illustrating an operation timeline of a TCCH slot and a structure of connection scheduling. As shown in FIG. 6, a TCCH slot includes four subchannels: connection scheduling, rate scheduling, data segment, and ACK. The rate scheduling subchannel includes a pilot segment and a CQI segment. The ACK subchannel is for transmitting a hybrid automatic repeat request (HARM) acknowledgment (ACK) or negative acknowledgement (NACK) in response to data received in the data segment subchannel. The connection scheduling subchannel includes two blocks, a higher priority Block H and a lower priority Block L. Each of Block H and Block L contains a plurality of resource elements, i.e., a plurality of subcarriers in the frequency domain and OFDM symbols in the time domain. Each of Block H and Block L spans the plurality of subcarriers and includes four OFDM symbols in a Txp-block, four OFDM symbols in a Tx-block, and four OFDM symbols in an Rx-block. One resource element (or tone) corresponds to one subcarrier and one OFDM symbol.

Each link has a CID. Based on the CID, for a particular TCCH slot, wireless nodes in a link are allocated a resource element in the same respective OFDM symbol position in each of the Txp-block, the Tx-block, and the Rx-block at a particular subcarrier and within Block H or Block L. For example, in a particular TCCH slot, a link with CID=4 may be allocated the resource element 602 in the Txp-block of Block H, the resource element 604 in the Tx-block of Block H, and the resource element 606 in the Rx-block of Block H for transmitting/receiving a scheduling control signal. The allocated trio of resource elements for the Txp-block, Tx-block, and Rx-block vary with respect to the subcarrier (e.g., k different subcarriers) and the respective OFDM symbol in each TCCH slot (e.g., 8 different OFDM symbols—4 in the Block H and 4 in the Block L).

The trio of resource elements allocated to a link dictates the medium access priority of the link. For example, the trio of resource elements 602, 604, 606 corresponds to i=2 and j=1. The medium access priority is equal to ki+j+1, where is the respective OFDM symbol in each of the Txp, Tx, and Rx subblocks, j is the subcarrier, and k is the number of subcarriers. Accordingly, assuming k=28, the resource elements 602, 604, 606 correspond to a medium access priority of 58.

Figure 7:
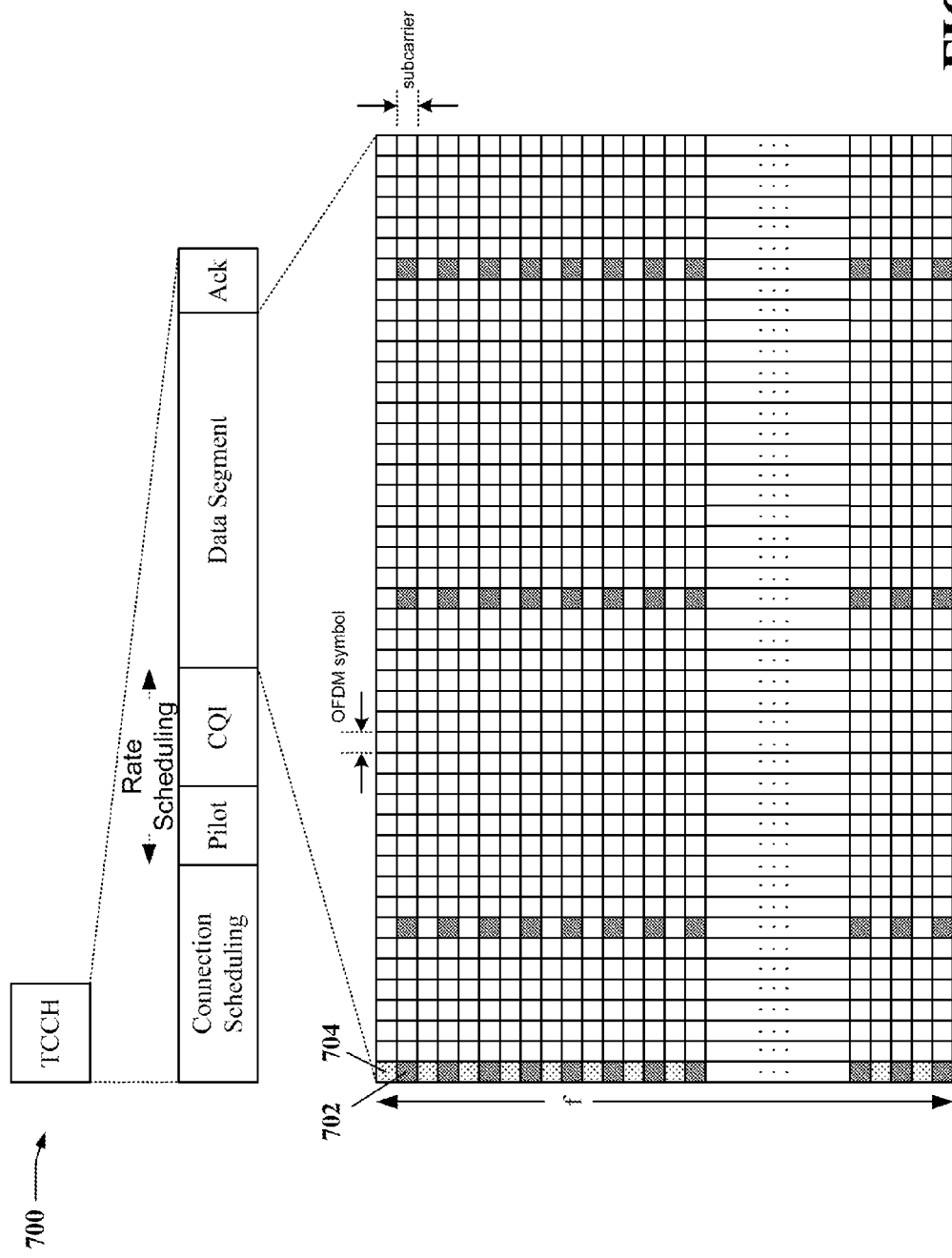
FIG. 7 is a diagram illustrating a structure of the data segment.

FIG. 7 is a diagram 700 illustrating a structure of the data segment. The data segment contains a plurality of resource elements spanning a plurality of subcarriers in the frequency domain and OFDM symbols in the time domain. Some of the resource elements in the data segment, such as resource element 704, may carry rate indicator information regarding the coding and/or modulation used for the data segment. Other resource elements in the data segment, such as resource element 702, may carry a pilot to allow for estimating the channel for demodulation and decoding.

Figure 8B:
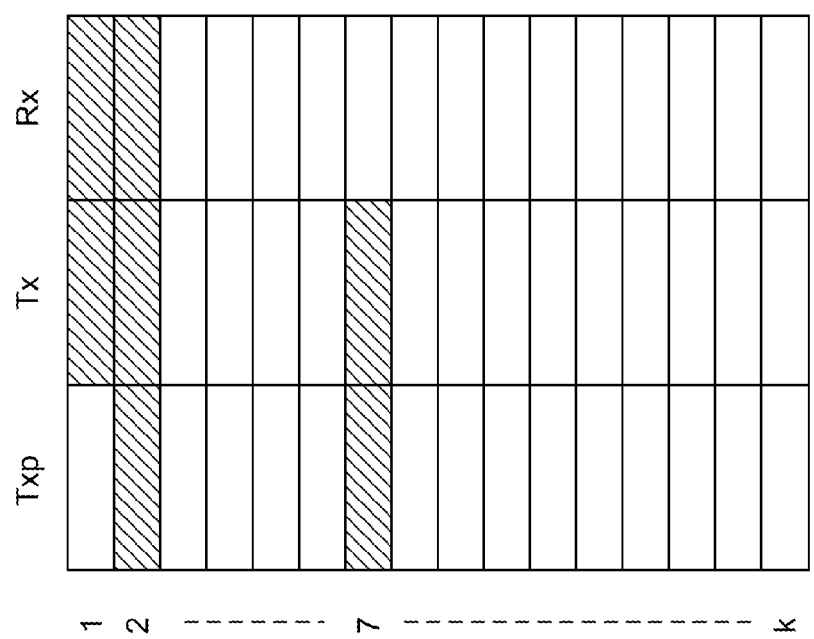
FIG. 8B is a second diagram for illustrating an exemplary connection scheduling signaling scheme for the wireless communications devices.
Figure 8A:
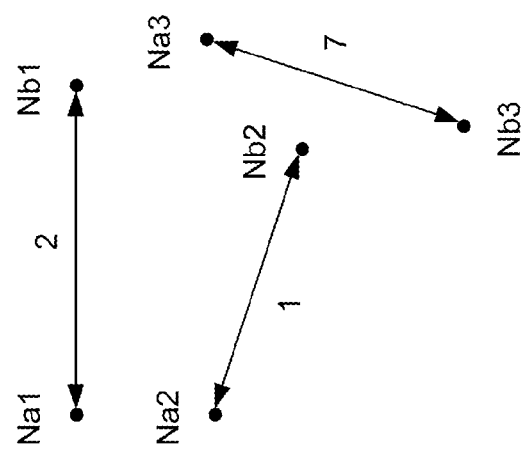
FIG. 8A is a first diagram for illustrating an exemplary connection scheduling signaling scheme for the wireless communications devices.

FIG. 8A is a first diagram for illustrating an exemplary connection scheduling signaling scheme for the wireless communications devices 100. As shown in FIG. 8A, wireless node a1 (Na1) is communicating with wireless node b1 (Nb1), wireless node a2 (Na2) is communicating with wireless node b2 (Nb2), and wireless node a3 (Na3) is communicating with wireless node b3 (Nb3). The wireless node Na1 is assumed to have transmit priority over the wireless node Nb1, the wireless node Na2 is assumed to have transmit priority over the wireless node Nb2, and the wireless node Na3 is assumed to have transmit priority over the wireless node Nb3. Each of the links has a different medium access priority depending on the particular slot for communication. For the particular slot for communication, link 1 (Na1, Nb1) is assumed to have a medium access priority of 2, link 2 (Na2, Nb2) is assumed to have a medium access priority of 1, and link 3 (Na3, Nb3) is assumed to have a medium access priority of 7.

FIG. 8B is a second diagram for illustrating an exemplary connection scheduling signaling scheme for the wireless communications devices 100. FIG. 8B shows connection scheduling resources of first respective OFDM symbols (i=0, see FIG. 6) of Txp, Tx, and Rx subblocks in Block H (corresponding to medium access priorities 1 through k) in the connection scheduling subchannel. The connection scheduling resources include a plurality of subcarriers, each of the subcarriers corresponding to one of k frequency bands. Each of the frequency bands corresponds to a particular medium access priority. One block in the connection scheduling resources is split into three subblocks/phases: Txp, Tx, and Rx. The Txp-block is used by the node with transmit priority in the link to indicate whether the node with transmit priority will act as a transmitter or a receiver. If the node with transmit priority transmits on the allocated OFDM symbol in the Txp-block, the node with transmit priority indicates to the node without transmit priority an intent to act as a transmitter. If the node with transmit priority does not transmit on the allocated OFDM symbol in the Txp-block, the node with transmit priority indicates to the node without transmit priority an intent to act as a receiver. The Tx-block is used by potential transmitters to make a request to be scheduled. The transmitter transmits a direct power signal on the allocated OFDM symbol in the Tx-block at a power equal to a power used for the traffic channel (i.e., data segment). Each potential receiver listens to the tones in the Tx-blocks, compares the received power on each of the Tx-blocks to the received power on the Tx-block allocated to the transmitter of its own link, and determines whether to Rx-yield based on its own link medium access priority relative to other link medium access priorities and the comparison. The Rx-block is used by the potential receivers. If the receiver chooses to Rx-yield, the receiver does not transmit in the allocated OFDM symbol in the Rx-block; otherwise, the receiver transmits an inverse echo power signal in the allocated OFDM symbol in the Rx-block at a power proportional to an inverse of the power of the received direct power signal from the transmitter of its own link All of the transmitters listen to the tones in the Rx-block to determine whether to Tx-yield transmission of the data segment.

The connection scheduling signaling scheme is best described in conjunction with an example. The node Na2 has no data to transmit and does not transmit in the Txp-block for medium access priority 1, the node Na1 has data to transmit and transmits in the Txp-block for medium access priority 2, and the node Na3 has data to transmit and transmits in the Txp-block for medium access priority 7. The node Nb2 has data to transmit and transmits in the Tx-block for medium access priority 1, the node Na1 transmits in the Tx-block for medium access priority 2, and the node Na3 transmits in the Tx-block for medium access priority 7. The node Na2 listens to the tones in the Tx-blocks and determines to transmit in the Rx-block for medium access priority 1, as the node Na2 has the highest priority. The node Nb1 listens to the tones in the Tx-blocks, determines that its link would not interfere with link 2, which has a higher medium access priority, and transmits in the Rx-block for medium access priority 2. The node Nb3 listens to the tones in the Tx-blocks, determines that its link would interfere with link 1 and/or link 2, both of which have a higher medium access priority, and Rx-yields by not transmitting in the Rx-block for medium access priority 7. Subsequently, both Nb2 and Na1 listen to the tones in the Rx blocks to determine whether to transmit the data. Because Nb2 has a higher link medium access priority than Na1, Nb2 transmits its data. Na1 will Tx-yield transmission of the data if Na1 determines that its transmission would interfere with the transmission from Nb2.

Figure 9:
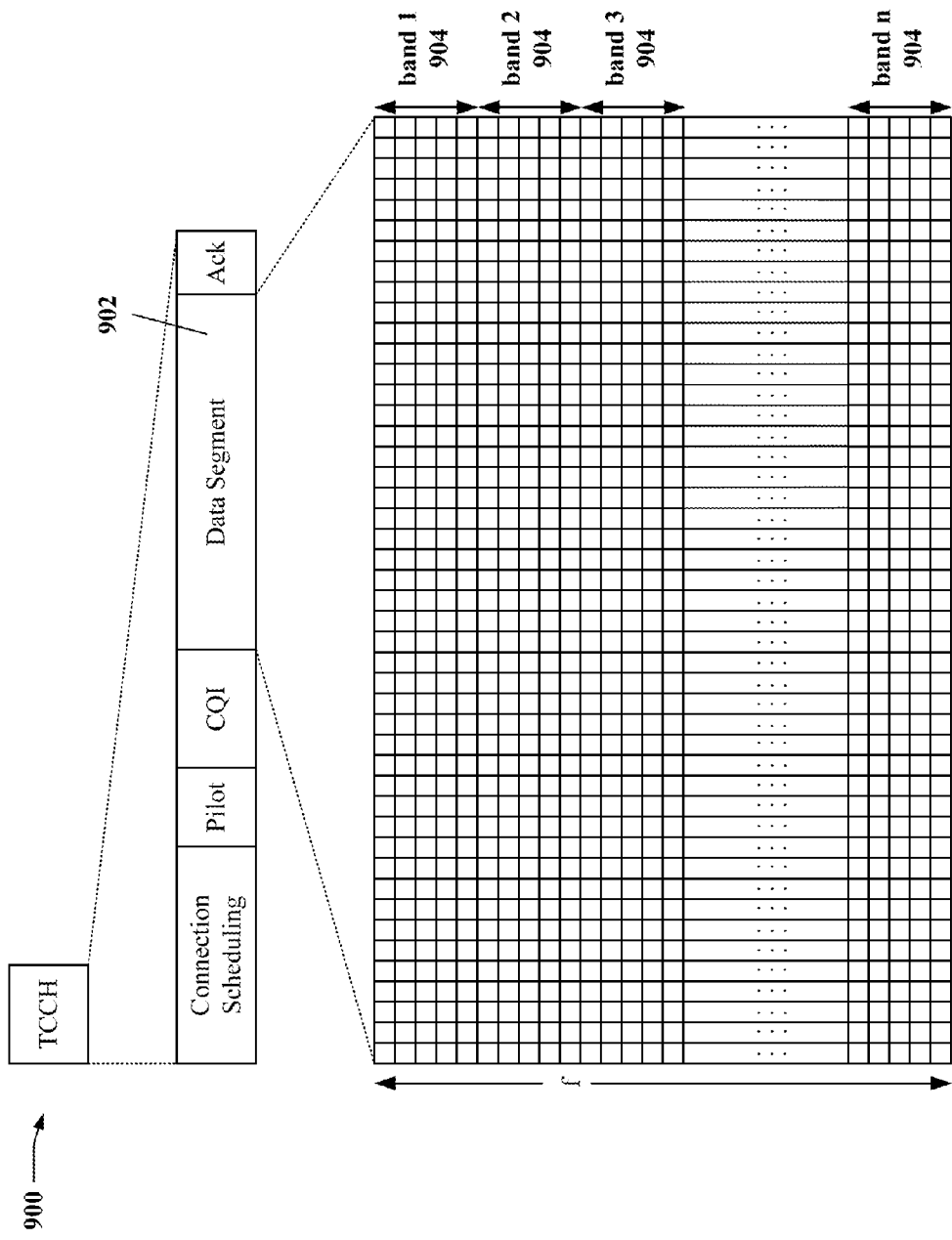
FIG. 9 is a diagram illustrating a structure of an exemplary data segment.

FIG. 9 is a diagram 900 illustrating a structure of an exemplary data segment. Long links are links that have a signal to noise ratio (SNR) below threshold when the entire frequency spectrum is used simultaneously. Short links are all links that are not long links. As discussed supra, due to the large footprint of long links, long links get scheduled less often compared to short links and/or high rate short links in the vicinity of long links cannot be scheduled. FDM alleviates this problem by orthogonalizing links in frequency to allow short and long links to be scheduled simultaneously. In the diagram 900, an exemplary data segment 902 for supporting FDM in a wireless ad-hoc peer-to-peer network (e.g., FlashLinQ) is provided. The data segment 902 is split into is split into n bands 904.

Each wireless link chooses a subset of preferred bands of the n bands. Links have a higher priority of being scheduled on their preferred bands. The subset may be ordered based on link priority such that if a link chooses first and second bands in the subset, the link may have a higher priority in the first band than in the second band. The subset can be of any size between 0 and n. Wireless links broadcast their CID and their preferred subset to neighboring links. The broadcast may be on a slow time scale (e.g., ~one second) using a broadcast channel. For example, the broadcast may utilize a portion of the reserved segments in the MCCH in either superframe index 0 or superframe index 7 (see FIG. 4 and FIG. 5). Specifically, the CID broadcast channel in the MCCH in superframe index 0 may be used to broadcast the subset of preferred bands. Each link maintains a list of neighboring links (i.e., CIDs) and their preferred subsets. A link may select the subset while establishing a connection, may choose the subset based on observations of neighboring links, and may attempt to avoid selecting bands that were selected by nearby links.

A relative priority may be defined based on the preferred bands selected by the links. If a particular band belongs to the preferred subset of a first link, but not to the preferred subset of a second link, the first link has priority over the second link. If a particular band belongs to the preferred subsets of both a first link and a second link, the priority may be determined based on another criterion such as sizes of the preferred subsets or a location/order of the band in the preferred subset. If a particular band does not belong to a preferred subset, priority may be predetermined or randomized based on some other identifier.

Links use the connection scheduling resource (see FIG. 6) concurrently for scheduling. However, links make scheduling decisions bandwise based on their priority within the bands. That is, for each band, links decide whether to Tx-yield the band to another transmission or whether to schedule on the band. Links determine whether to yield or to schedule on a band based on the relative priority associated with each of the n bands and based on scheduling control signals received from other links. An example best demonstrates the process of making bandwise scheduling decisions.

Figure 10B:
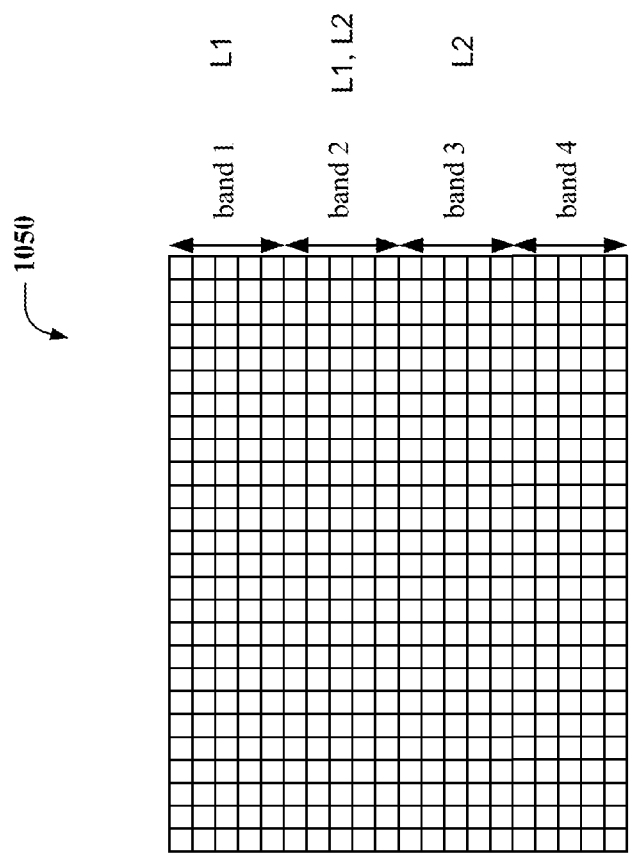
FIG. 10B is a second diagram for illustrating bandwise scheduling.
Figure 10A:
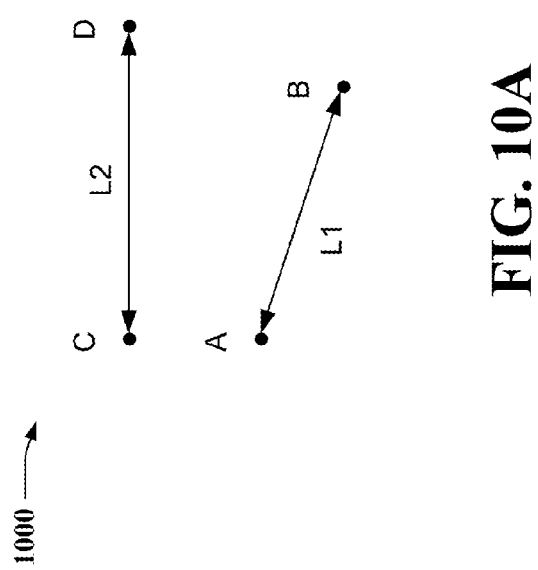
FIG. 10A is a first diagram for illustrating bandwise scheduling.

FIG. 10A is a first diagram 1000 for illustrating bandwise scheduling. FIG. 10B is a second diagram 1050 for illustrating bandwise scheduling. As shown in FIG. 10A, wireless nodes A and B are communicating in a first link L1 and wireless nodes C and D are communicating in a second link L2. As shown in FIG. 10B, link L1 selected band 1 and band 2 as its preferred bands and link L2 selected band 2 and band 3 as its preferred bands. Band 4 was not selected by either of link L1 or link L2. As discussed supra, each of the links L1, L2 broadcasts its CID and preferred bands. As such, L1 knows the CID for L2 and the preferred bands selected by L2 and L2 knows the CID for L1 and the preferred bands selected by L1.

As discussed supra, during connection scheduling, each of the links may broadcast a scheduling control signal on the Txp, Tx, and Rx subblocks. Assume that both links L1 and L2 transmit in the Tx and Rx phases in connection scheduling. The link L1 receives the Tx or Rx transmission by L2 and determines the CID of the broadcast based on the subcarrier and the OFDM symbol of the broadcast. The link L1 then determines the preferred bands associated with the CID.

For each band, L1 determines whether to Tx-yield or to schedule on the band. As such, for band 1, the link L1 determines that because band 1 is its preferred band and is not a preferred band of the link L2, it may schedule on band 1. For band 2, the link L1 determines that because band 2 is both its preferred band and the preferred band of the link L2, it must rely on other criteria to determine whether to schedule or to Tx-yield. For example, the link L1 may Tx-yield to the link L2 if the preferred subset of the link L1 is larger than the preferred subset of the link L2. In this case, the preferred subsets each has size two and are therefore equal in size. In another example, the link L1 may determine to Tx-yield or to schedule based on the location/order of the band in the preferred subsets. In such a configuration, if the preferred subset of the link L1 lists the preferred bands in the order band 1, band 2, but the link L2 lists the preferred bands in the order band 2, band 3, the link L1 may Tx-yield to the link L2 because band 2 is listed second in the preferred subset of the link L1 and therefore has a lower priority in the preferred subset for link L1 and is listed first in the preferred subset of the link L2 and therefore has a higher priority in the preferred subset for the link L2. For band 3, the link L1 Tx-yields to the link L2 because band 3 is a preferred band of the link L2 and is not a preferred band in the link L1. For band 4, the link L1 determines that because band 4 is not a preferred band for either of the links, the link L1 must rely on other criteria to determine whether to schedule or to Tx-yield. In such a situation, the link L1 may determine whether to Tx-yield or to schedule based on a predetermined or randomized priority for the particular TCCH slot.

Similarly, for each band, the link L2 determines whether to Tx-yield or to schedule on the band. As such, for band 1, the link L2 determines that because band 1 is not its preferred band and is a preferred band of the link L1, that it should Tx-yield on band 1. For band 2, the link L2 determines that because band 2 is both its preferred band and the preferred band of the link L1, it must rely on other criteria to determine whether to schedule or to Tx-yield. For band 3, the link L2 determines that because band 3 is its preferred band and is not a preferred band of the link L2, that is may schedule on band 3. For band 4, the link L2 determines that because band 4 is not a preferred band for either of the links, it must rely on other criteria to determine whether to schedule or to Tx-yield, such as for example, on a predetermined or randomized priority for the particular TCCH slot.

In the example supra, each of the links L1, L2 were contending for the resource. If, for example, the link L2 has no data to transmit for the particular TCCH slot, and therefore sends no scheduling control signal (e.g., Tx and/or Rx), the link L1 will not yield to the link L2 and may therefore schedule on all four of the bands.

Furthermore, as discussed supra, links determine whether to Tx-yield or to schedule on each of the bands. With respect to Rx-yielding, a link will not Rx-yield if there is at least one band on which the link can transmit the data without interfering with another link. With the proposed FDM scheme, Rx-yielding is expected to occur less frequently, as even with a low priority, there is a greater chance of getting access to one of the bands without causing interference to another link than getting access to the entire resource without causing interference to another link.

In one configuration, the preferred subset is not determined by the link but is chosen pseudorandomly based on the CID and the time. Such an approach has the advantage of reducing the overhead of communicating the preferred subsets. In another configuration, the size of the preferred subset depends on the link length/distance and the data rate. As such, a short link that requires a high data rate may chose a large preferred subset, a long link may choose a small preferred subset, and a short link with low data rate may choose a small preferred subset. In another configuration, the preferred subsets could be predetermined. For example, all long links may have a preferred subset of 1 band and all short links may have a preferred subset of 2 to n bands. In another configuration, along with the scheduling requests, each link may also send the bands for which the link is contending. In another configuration, the n bands could be of different sizes (i.e., each have a different number of subcarriers). In another configuration, the bands could be time orthogonal resources rather than frequency orthogonal resources. In such an approach, long links that are power limited may not necessarily benefit. However, the approach could be useful for improving performance of long links by allocating some resources to them in an existing TDM system.

FIG. 11A is a first diagram 1100 for illustrating splitting the bands between long and short links. FIG. 11B is a second diagram 1150 for illustrating splitting the bands between long and short links. The frequency spectrum may be split into two (possibly unequal) sub-bands band 1 and band 2. In band 1 only short links, such as the link L2, can contend for the resources. In band 2, the long links, such as the link L1, always get priority over the short links. The long links contend only for band 2. The short links contend for both band 1 and band 2.

In another example, the frequency spectrum may be split into multiple sub-bands. The long links may contend only in their preferred band. The short links may contend in multiple bands. The short links may contend in a different number of bands based on their SNR. In one variant of the scheme all the links have one preferred band. The links may have a highest priority level in their preferred band. In other bands, the priority level may be a function of the preferred band. In other variant, the short links may choose multiple bands as their preferred bands. The selection of the preferred band may be based on load balancing or may be random as a function of time. When based on load balancing, a link may choose the band in which there are the least number of links, the access to the medium being mutually exclusive.

Figure 12:
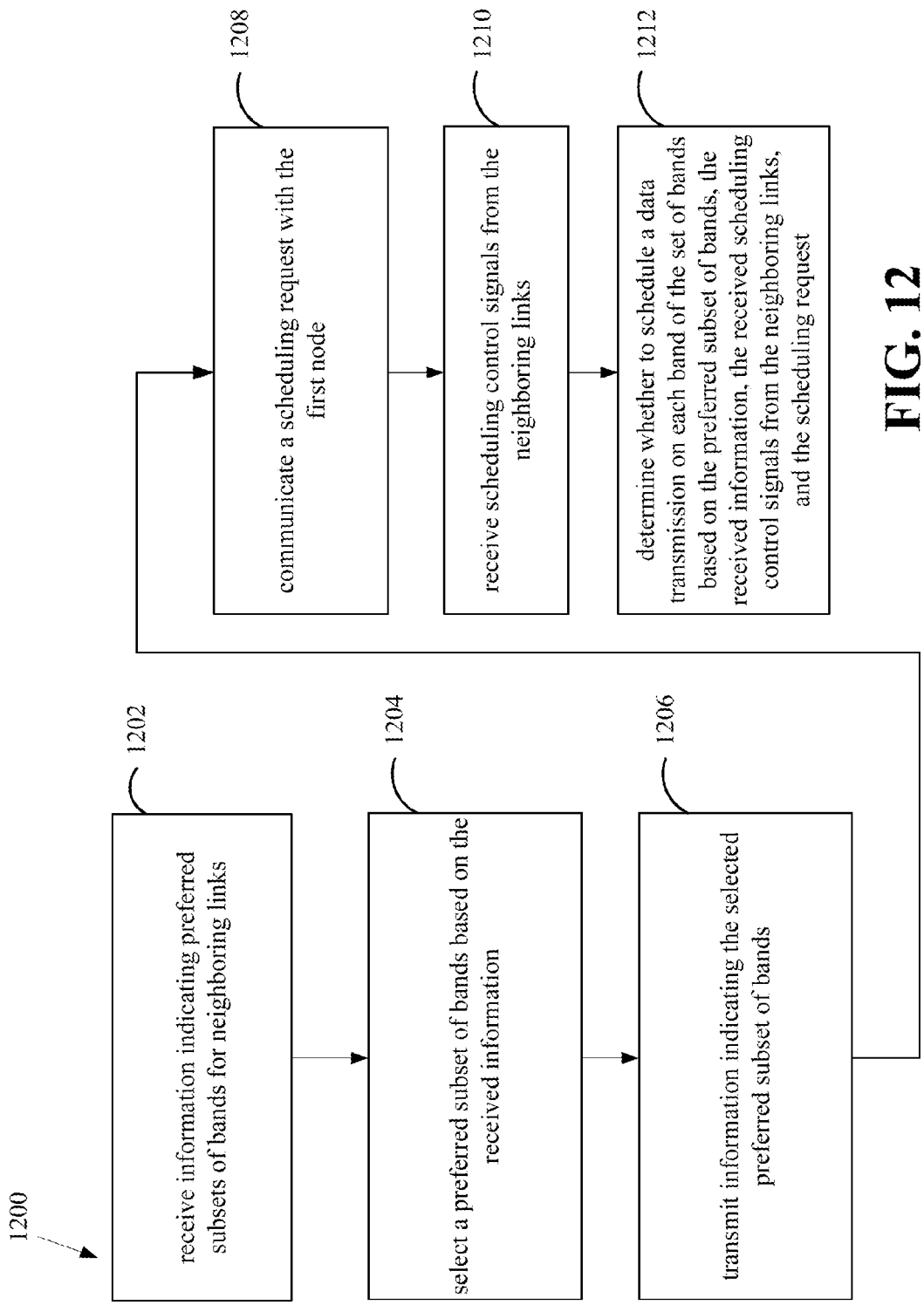
FIG. 12 is a flow chart of a method of wireless communication.

FIG. 12 is a flow chart 1200 of an exemplary method. The method is performed by a wireless device in peer-to-peer communication with a first node. As shown in FIG. 12, the wireless device determines a preferred subset of bands of a set of bands for communicating with a first node. To determine the preferred subset of bands, the wireless device receives information indicating preferred subsets of bands for neighboring links (1202) and selects the preferred subset of bands based on the received information (1204). In addition, the wireless device transmits information indicating the selected preferred subset of bands (1206). The wireless device communicates a scheduling request with the first node (1208) and receives scheduling control signals from the neighboring links (1210). Subsequently, the wireless device determines whether to schedule a data transmission on each band of the set of bands based on the preferred subset of bands, the received information, the received scheduling control signals from the neighboring links, and the scheduling request (1212).

In one configuration, the information is transmitted with the scheduling request. In one configuration, the preferred subset of bands is determined based on a connection identifier and a time. In one configuration, to determine whether to schedule the data transmission, for each band in the set of bands the wireless device determines a priority for the communication with the first node based on the preferred subset of bands, determines priorities for neighboring links based on their preferred subsets of bands, and determines whether to schedule the data on the band based on the priority for the communication with the first node and the priority for the neighboring links. In one configuration, the priority for the communication with the first node and the priority for the neighboring links is based on a connection identifier and a time. In another configuration, the scheduling request includes a transmission request and a transmission request response or non-response and the data transmission is scheduled only when the transmission request response is transmitted. In one configuration, to determine the preferred subset of bands, the wireless device determines the preferred subset to include m bands when an SNR with the first node is greater than a first threshold and communication with the first node requires a data rate above a second threshold. In addition, in such a configuration, the wireless device determines the preferred subset to include n bands, n being less than m, when the SNR with the first node is less than the first threshold or the communication with the first node requires a data rate that is below the second threshold. In one configuration, the preferred subset of bands is predetermined. In one configuration, the subset of bands is predetermined based on at least one of an SNR with the first node in relation to a first threshold and a data rate in relation to a second threshold. In one configuration, at least two of the bands in the set of bands have different sizes. In one configuration, the bands are frequency orthogonal bands. In one configuration, the bands are time orthogonal bands.

Figure 13:
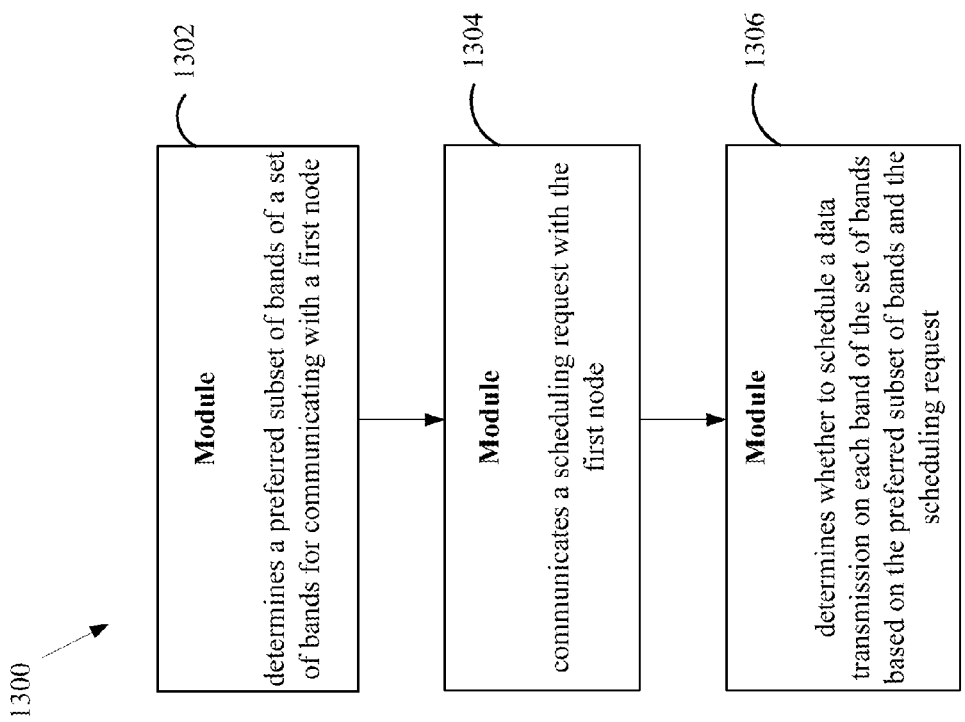
FIG. 13 is a conceptual block diagram illustrating the functionality of an exemplary apparatus.

FIG. 13 is a conceptual block diagram 1300 illustrating the functionality of an exemplary apparatus 100. The apparatus 100 includes a module 1302 that determines a preferred subset of bands of a set of bands for communicating with a first node, a module 1304 that communicates a scheduling request with the first node, and a module 1306 that determines whether to schedule a data transmission on each band of the set of bands based on the preferred subset of bands and the scheduling request.

Referring to FIG. 1, in one configuration, the apparatus 100 for wireless communication includes means for determining a preferred subset of bands of a set of bands for communicating with a first node, means for communicating a scheduling request with the first node, and means for determining whether to schedule a data transmission on each band of the set of bands based on the preferred subset of bands and the scheduling request. In one configuration, the means for determining the preferred subset of bands includes means for receiving information indicating preferred subsets of bands for neighboring links, and means for selecting the preferred subset of bands based on the received information. In one configuration, the apparatus 100 further includes means for transmitting information indicating the selected preferred subset of bands. In one configuration, the means for determining whether to schedule the data transmission includes for each band in the set of bands means for determining a priority for the communication with the first node based on the preferred subset of bands, means for determining priorities for neighboring links based on their preferred subsets of bands, and means for determining whether to schedule the data on the band based on the priority for the communication with the first node and the priority for the neighboring links. In one configuration, the apparatus 100 further includes means for receiving scheduling control signals from the neighboring links. In one configuration, the means for determining the preferred subset of bands includes means for determining the preferred subset to include m bands when an SNR with the first node is greater than a first threshold and communication with the first node requires a data rate above a second threshold; and means for determining the preferred subset to include n bands, n being less than m, when the SNR with the first node is less than the first threshold or the communication with the first node requires a data rate that is below the second threshold. The aforementioned means is the processing system 114 configured to perform the functions recited by the aforementioned means.

It is understood that the specific order or hierarchy of steps in the processes disclosed is an illustration of exemplary approaches. Based upon design preferences, it is understood that the specific order or hierarchy of steps in the processes may be rearranged. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. A method of operating a wireless device, comprising:
    determining a preferred subset of bands of a set of bands for communicating with a first node, the determining the preferred subset of bands comprising:
        determining the preferred subset to include m bands when a signal to noise ratio (SNR) with the first node is greater than a first threshold and communication with the first node requires a data rate above a second threshold; and
        determining the preferred subset to include n bands, n being less than m, when the SNR with the first node is less than the first threshold or the communication with the first node requires a data rate that is below the second threshold;
    communicating a scheduling request with the first node; and
    determining whether to schedule a data transmission on each band of the set of bands based on the preferred subset of bands and the scheduling request.

2. The method of claim 1, wherein the determining the preferred subset of bands further comprises:
    receiving information indicating preferred subsets of bands for neighboring links; and
    selecting the preferred subset of bands based on the received information.

3. The method of claim 2, further comprising transmitting information indicating the selected preferred subset of bands.

4. The method of claim 3, wherein the information is transmitted with the scheduling request.

5. The method of claim 1, wherein the preferred subset of bands is determined based on a connection identifier and a time.

6. The method of claim 1, wherein the determining whether to schedule the data transmission comprises for each band in the set of bands:
    determining a priority for the communication with the first node based on the preferred subset of bands;
    determining priorities for neighboring links based on their preferred subsets of bands; and
    determining whether to schedule the data on the band based on the priority for the communication with the first node and the priority for the neighboring links.

7. The method of claim 6, wherein the priority for the communication with the first node and the priority for the neighboring links is based on a connection identifier and a time.

8. The method of claim 6, further comprising receiving scheduling control signals from the neighboring links, wherein the determining whether to schedule the data on the band is further based on the received scheduling control signals.

9. The method of claim 1, wherein the scheduling request comprises a transmission request and a transmission request response or non-response, wherein the data transmission is scheduled only when the transmission request response is transmitted.

10. The method of claim 1, wherein the preferred subset of bands is predetermined.

11. The method of claim 10, wherein the subset of bands is predetermined based on at least one of a signal to noise ratio (SNR) with the first node in relation to a first threshold and a data rate in relation to a second threshold.

12. The method of claim 1, wherein at least two of the bands in the set of bands have different sizes.

13. The method of claim 1, wherein the bands are frequency orthogonal bands.

14. The method of claim 1, wherein the bands are time orthogonal bands.

15. An apparatus for wireless communication, comprising:
   means for determining a preferred subset of bands of a set of bands for communicating with a first node, the means for determining the preferred subset of bands comprising:
      means for determining the preferred subset to include m bands when a signal to noise ratio (SNR) with the first node is greater than a first threshold and communication with the first node requires a data rate above a second threshold; and
      means for determining the preferred subset to include n bands, n being less than m, when the SNR with the first node is less than the first threshold or the communication with the first node requires a data rate that is below the second threshold;
   means for communicating a scheduling request with the first node; and
   means for determining whether to schedule a data transmission on each band of the set of bands based on the preferred subset of bands and the scheduling request.

16. The apparatus of claim 15, wherein the means for determining the preferred subset of bands further comprises:
   means for receiving information indicating preferred subsets of bands for neighboring links; and
   means for selecting the preferred subset of bands based on the received information.

17. The apparatus of claim 16, further comprising means for transmitting information indicating the selected preferred subset of bands.

18. The apparatus of claim 17, wherein the information is transmitted with the scheduling request.

19. The apparatus of claim 15, wherein the preferred subset of bands is determined based on a connection identifier and a time.

20. The apparatus of claim 15, wherein the means for determining whether to schedule the data transmission comprises for each band in the set of bands:
   means for determining a priority for the communication with the first node based on the preferred subset of bands;
   means for determining priorities for neighboring links based on their preferred subsets of bands; and
   means for determining whether to schedule the data on the band based on the priority for the communication with the first node and the priority for the neighboring links.

21. The apparatus of claim 20, wherein the priority for the communication with the first node and the priority for the neighboring links is based on a connection identifier and a time.

22. The apparatus of claim 20, further comprising means for receiving scheduling control signals from the neighboring links, wherein the means for determining whether to schedule the data on the band is further based on the received scheduling control signals.

23. The apparatus of claim 15, wherein the scheduling request comprises a transmission request and a transmission request response or non-response, wherein the data transmission is scheduled only when the transmission request response is transmitted.

24. The apparatus of claim 15, wherein the preferred subset of bands is predetermined.

25. The apparatus of claim 24, wherein the subset of bands is predetermined based on at least one of a signal to noise ratio (SNR) with the first node in relation to a first threshold and a data rate in relation to a second threshold.

26. The apparatus of claim 15, wherein at least two of the bands in the set of bands have different sizes.

27. The apparatus of claim 15, wherein the bands are frequency orthogonal bands.

28. The apparatus of claim 15, wherein the bands are time orthogonal bands.

29. A computer program product in a wireless device, comprising:
   a non-transitory computer-readable storage medium comprising code for:
      determining a preferred subset of bands of a set of bands for communicating with a first node, the determining the preferred subset of bands comprising:
         determining the preferred subset to include m bands when a signal to noise ratio (SNR) with the first node is greater than a first threshold and communication with the first node requires a data rate above a second threshold; and
         determining the preferred subset to include n bands, n being less than m, when the SNR with the first node is less than the first threshold or the communication with the first node requires a data rate that is below the second threshold;
      communicating a scheduling request with the first node; and
      determining whether to schedule a data transmission on each band of the set of bands based on the preferred subset of bands and the scheduling request.

30. The computer program product of claim 29, wherein the code for determining the preferred subset of bands comprises code for:
   receiving information indicating preferred subsets of bands for neighboring links; and
   selecting the preferred subset of bands based on the received information.

31. The computer program product of claim 30, wherein the non-transitory computer-readable storage medium further comprises code for transmitting information indicating the selected preferred subset of bands.

32. The computer program product of claim 31, wherein the information is transmitted with the scheduling request.

33. The computer program product of claim 29, wherein the preferred subset of bands is determined based on a connection identifier and a time.

34. The computer program product of claim 29, wherein the code for determining whether to schedule the data transmission comprises for each band in the set of bands code for:

determining a priority for the communication with the first node based on the preferred subset of bands;
determining priorities for neighboring links based on their preferred subsets of bands; and
determining whether to schedule the data on the band based on the priority for the communication with the first node and the priority for the neighboring links.

35. The computer program product of claim 34, wherein the priority for the communication with the first node and the priority for the neighboring links is based on a connection identifier and a time.

36. The computer program product of claim 34, further comprising code for receiving scheduling control signals from the neighboring links, wherein the code for determining whether to schedule the data on the band is further based on the received scheduling control signals.

37. The computer program product of claim 29, wherein the scheduling request comprises a transmission request and a transmission request response or non-response, wherein the data transmission is scheduled only when the transmission request response is transmitted.

38. The computer program product of claim 29, wherein the preferred subset of bands is predetermined.

39. The computer program product of claim 38, wherein the subset of bands is predetermined based on at least one of a signal to noise ratio (SNR) with the first node in relation to a first threshold and a data rate in relation to a second threshold.

40. The computer program product of claim 29, wherein at least two of the bands in the set of bands have different sizes.

41. The computer program product of claim 29, wherein the bands are frequency orthogonal bands.

42. The computer program product of claim 29, wherein the bands are time orthogonal bands.

43. An apparatus for wireless communication, comprising:
a processing system configured to:
determine a preferred subset of bands of a set of bands for communicating with a first node, wherein to determine the preferred subset of bands the processing system is configured to:
determine the preferred subset to include m bands when a signal to noise ratio (SNR) with the first node is greater than a first threshold and communication with the first node requires a data rate above a second threshold; and
determine the preferred subset to include n bands, n being less than m, when the SNR with the first node is less than the first threshold or the communication with the first node requires a data rate that is below the second threshold;
communicate a scheduling request with the first node; and
determine whether to schedule a data transmission on each band of the set of bands based on the preferred subset of bands and the scheduling request.

44. The apparatus of claim 43, wherein to determine the preferred subset of bands, the processing system is further configured to:
receive information indicating preferred subsets of bands for neighboring links; and
select the preferred subset of bands based on the received information.

45. The apparatus of claim 44, wherein the processing system is further configured to transmit information indicating the selected preferred subset of bands.

46. The apparatus of claim 45, wherein the information is transmitted with the scheduling request.

47. The apparatus of claim 43, wherein the preferred subset of bands is determined based on a connection identifier and a time.

48. The apparatus of claim 43, wherein to determine whether to schedule the data transmission, the processing system is configured for each band in the set of bands to:
determine a priority for the communication with the first node based on the preferred subset of bands;
determine priorities for neighboring links based on their preferred subsets of bands; and
determine whether to schedule the data on the band based on the priority for the communication with the first node and the priority for the neighboring links.

49. The apparatus of claim 48, wherein the priority for the communication with the first node and the priority for the neighboring links is based on a connection identifier and a time.

50. The apparatus of claim 48, wherein the processing system is further configured to receive scheduling control signals from the neighboring links, wherein the processing system is further configured to determine whether to schedule the data on the band based on the received scheduling control signals.

51. The apparatus of claim 43, wherein the scheduling request comprises a transmission request and a transmission request response or non-response, wherein the data transmission is scheduled only when the transmission request response is transmitted.

52. The apparatus of claim 43, wherein the preferred subset of bands is predetermined.

53. The apparatus of claim 52, wherein the subset of bands is predetermined based on at least one of a signal to noise ratio (SNR) with the first node in relation to a first threshold and a data rate in relation to a second threshold.

54. The apparatus of claim 43, wherein at least two of the bands in the set of bands have different sizes.

55. The apparatus of claim 43, wherein the bands are frequency orthogonal bands.

56. The apparatus of claim 43, wherein the bands are time orthogonal bands.

* * * * *